May 10, 1932. N. H. NELSON ET AL 1,857,210
AUTOMOBILE SIGNALING DEVICE
Filed Dec. 21, 1925  3 Sheets-Sheet 1
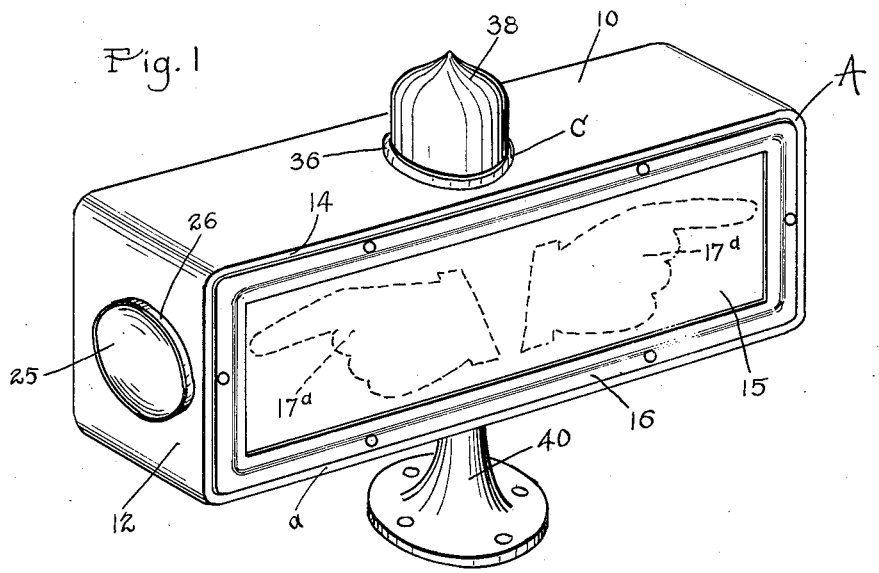
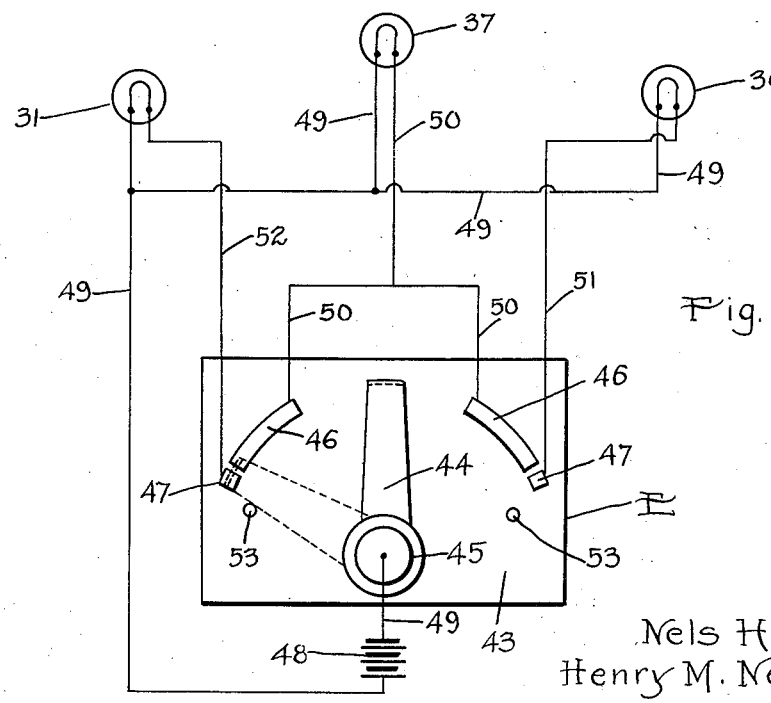
Inventors
Nels H. Nelson
Henry M. Nelson
By Bradbury & Caswell
Attorneys May 10, 1932.  N. H. NELSON ET AL  1,857,210
AUTOMOBILE SIGNALING DEVICE
Filed Dec. 21, 1925    3 Sheets-Sheet 2

Inventor
Nels H. Nelson
Henry M. Nelson
By Bradbury & Caswell
Attorneys

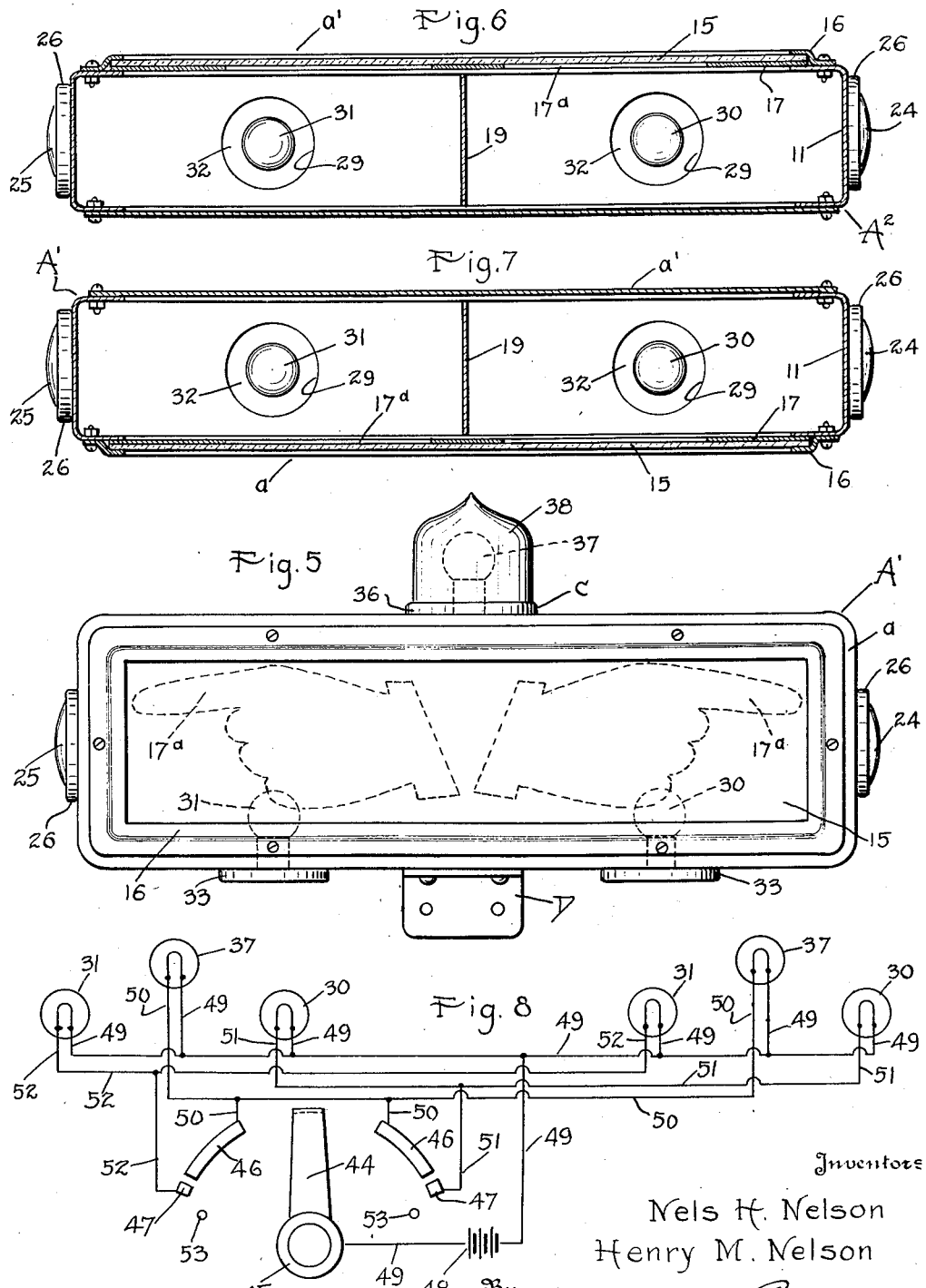

Patented May 10, 1932

1,857,210

UNITED STATES PATENT OFFICE

NELS H. NELSON AND HENRY M. NELSON, OF MINNEAPOLIS, MINNESOTA

AUTOMOBILE SIGNALING DEVICE

Application filed December 21, 1925. Serial No. 76,752.

Our invention relates to improvements in automobile signaling devices.

An object of the invention is to provide a simple, durable, inexpensive and sightly signaling device for automobiles capable of being conveniently operated and adapted first to warn of a premeditated change in direction of travel, and thereafter to indicate clearly the direction proposed to be taken upon such change.

Another object of the invention is to provide a device as above, the same being adapted to signal its warning and to indicate premeditated changes in travel in four directions; viz, to the front, to the back and to both sides of the automobile.

A further object is to provide a structure for effecting four-way signaling, which is not only inexpensive in production, but adapted to function efficiently with a minimum number of lamps and a correspondingly low consumption of electric current.

With the foregoing and other objects in view, which will appear in the following description, the invention resides in the novel combination and arrangement of parts and in the details of construction hereinafter described and claimed.

Figure 3:
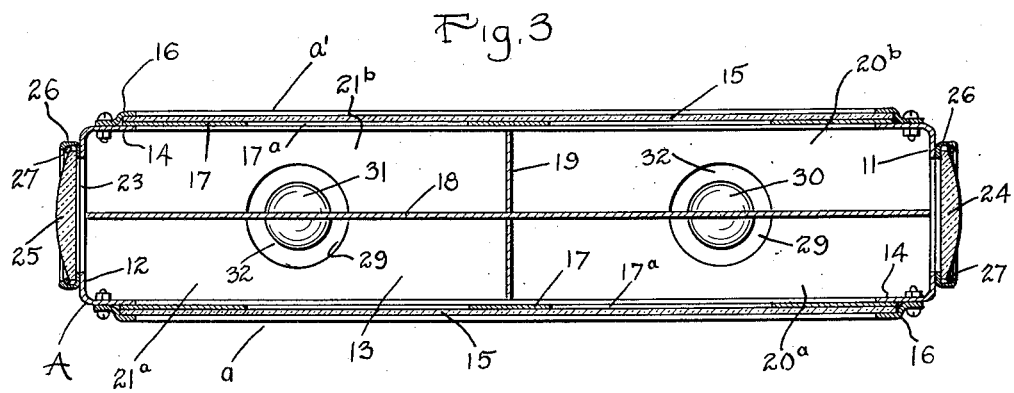
Figure 2:
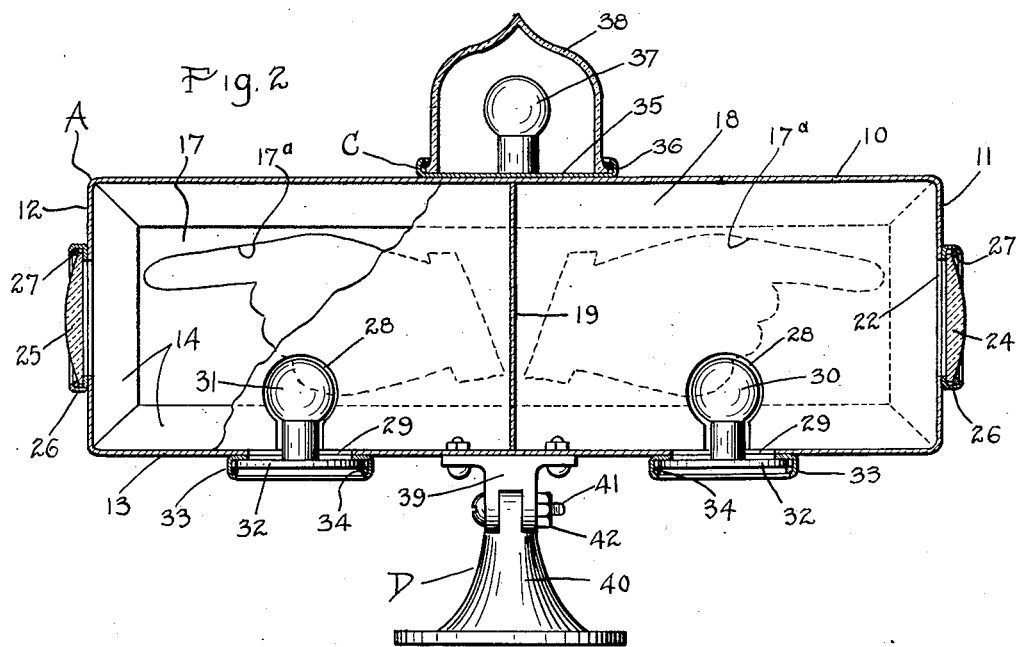

In the drawings, Fig. 1 is a perspective view of a device embodying our invention; Fig. 2 is a vertical, longitudinal, sectional view of the device, said view being taken on a line slightly off center and showing a portion of the central, longitudinal partition broken away at one end thereof; Fig. 3 is a horizontal, longitudinal, sectional view of the device; Fig. 4 is an elevational view of the operating switch for the device, said view being accompanied with a wiring diagram including the lamps of the device and the contacting members of the switch; Fig. 5 is an elevational view of one of two housings included in a modification of our invention; Figs. 6 and 7 are horizontal, sectional views of such housings and Fig. 8 is a wiring diagram including the lamps of the two housings and the contacting members of an electrical switch for operating said lamps.

Referring particularly to Figs. 1 to 4 inclusive of the drawings, it will be seen that the device illustrated therein includes an elongated housing A comprising a top wall 10, end-walls 11 and 12 and a bottom wall 13, also a sidewall $a$ at the front and a sidewall $a'$ at the back of the housing. Said top wall, endwalls and bottom walls are formed from a strip of sheet metal bent on four transverse lines and having the marginal portions at its sides bent inward to form face-flanges 14 at either side of the housing. The sidewalls $a$ and $a'$ are identical, each including a panel 15 of translucent glass held in and framed by an endless molding 16 secured to the face-flange 14 at one side of the housing. A sheet-like screen 17 of opaque material is provided for each side panel 15, each screen 17 being disposed between its respective panel 15 and the adjacent face-flange 14.

Within the housing A is an upright, longitudinal, central partition 18 and an upright, transverse, central partition 19. These partitions divide the housing into two pairs of front and back compartments $20^a$, $20^b$, and $21^a$, $21^b$ (Fig. 3), one pair on each side of said transverse partition 19. An opening 22, having its center in the plane of the longitudinal partition 18, is cut in the endwall 11, a similar opening 23 formed in the endwall 12 being similarly disposed with respect to said partition. The openings 22 and 23 are respectively covered by lens 24 and 25, each lens being held in an annular frame 26 on the housing by means of a locking ring 27 of spring wire.

The upright, longitudinal partition 18 is formed with lamp receiving openings 28, in its lower marginal portion, one at one side of the transverse partition 19 and one at the other side thereof. In the bottom wall 13 of the housing, beneath each lamp receiving opening 28, is an opening 29, the center of each of said openings lying in the plane of said partition 18. A lamp 30 is provided for the pair of compartments $20^a$, $20^b$, a second lamp 31 being provided for the pair of compartments $21^a$, $21^b$. Each lamp, mounted on a base-plate 32, is adapted to be passed through one of the openings 29 and thence erected in the adjacent lamp receiving opening 28 in the partition 18. An annular frame 33 for each base-plate 32 is secured to the underside of the bottom wall 13 in registration with the opening 29 therein for admitting to the housing the lamp on said base-plate. Each base-plate 32 is removably clamped in its respective frame 33 in position disposing the lamp thereon in the opening 28 in the partition 18 for said lamp, the plate clamping means comprising a locking-ring 34 of spring wire, which is normally expanded in said frame to clamp the base-plate 32 therein.

Secured on the top wall 10 of the housing is a frame c comprising a base-plate 35 having an upturned annular flange 36 turned slightly inward at its upper marginal portion. Centrally of said plate we mount a warning lamp 37, the same being encased in a colored glass dome 38 adapted to attract attention when the same is illuminated from within by the lamp 37.

The screens 17 are patterned with cut-outs 17ª, in the present instance, in the conventional form of a pointing hand. These cut-outs comprising symbols, which are clearly rendered visible by illumination from the lamps 30 and 31 and which are indicative of premeditated changes in direction of travel. In the screen 17 at the front wall a of the housing are two cut-outs 17a, one formed at one side of the partition 19 for the compartment 20ª and one at the other side of said partition for the compartment 21ª. Similarly, in the screen 17 at the back wall a' of the housing, we form two cut-outs, the one for the compartment 20ᵇ comprising a symbol indicative of the same direction as that of the symbol for the companion front compartment 20ª and the one for the compartment 21ᵇ comprising a symbol indicative of the same direction as that of the symbol for the companion front compartment 21ª.

The lens 24, 25 in the endwalls 11, 12 are preferably colored red so that when illuminated from within the housing, observers from either side of the device will be apprised of a proposed change in direction of travel and of the danger impending if the signal be not heeded.

The housing A is mounted on a head 39 of a bracket D, said bracket including a base 40 for anchorage in any convenient place on an automobile, wherein the front and back walls of the housing are respectively visible from ahead and from behind and the endwalls respectively visible from the sides of the automobile. A pivot bolt 41 joins the head 39 to the base 40 of the bracket D and a nut 42 fitted on said bolt 41 provides for clamping the head 39 in various angular relations on said base, whereby the housing properly may be disposed in various relative positions of said base 40.

Within the convenient access of the driver of an automobile equipped with our improved signaling device, we place a switch E (Fig. 4), the same being electrically connected with the lamps 30, 31 and 37 and with a source of electrical energy. This switch E includes a base 43 and a contact bar 44 pivoted on said base. At the pivotal point of said bar 44 is an actuating knob 45, the manipulation whereof swings the bar 44 forth and back on the base, thus causing the free end of said bar to sweep from side to side of said base. Mounted at each side of the base 43 are a pair of arcuate contact plates 46 and 47, arranged end-to-end, the plate 46 being relatively long and disposed between the shorter plate 47 and the upright neutral position (solid lines, Fig. 4) of the bar 44. Said bar is connected with an electric battery 48 and with each of the lamps 30, 31 and 37 through wires 49. The long contact plates 46 are connected with the warning lamp 37 through wires 50, one of the short contact plates 46 being connected with the lamp 30 through the wire 51 and the other short contact plate 46 connected with the lamp 31 through the wire 52. In swinging the bar 44 from neutral position (solid lines, Fig. 4) in either direction, the throw thereof is limited by a stop pin 53. At the beginning of either throw, contact is made between the bar 44 and one of the long plates 46, while at the end of each throw, contact is also made between said bar 44 and the companion plate 47. Thus, it will be understood that upon either throw of the switch bar 44, the warning lamp 37 will be lighted and following thereafter one or the other of said lamps 30 and 31 also will be lighted. The lighting of the warning lamp 37 apprises observers of the signal that a change in direction of travel is premeditated by the driver of the automobile carrying the device. Being put on guard, such observers are then apprised of the new direction of travel proposed to be taken. If the lamp 30 is lighted those observers in front see at the front of device the outline of a hand indicating a proposed left turn. These observers at the rear see a similar symbol at the back of the device, while those at the left side see the illuminated red lens 24. If the lamp 31 is lighted, those observers at the front and back see at the respective sides of the indicator a symbol appropriately designing a proposed right turn, while those observers at the right see the illuminated red lens 25, which is indicative of a premeditated change in travel of which they should take heed. Thus, it will be seen that the user of our improved signaling device may flash a preliminary warning visible in four directions and thereafter plainly indicate to those in front, at the rear and at the side the change in direction of travel that he proposes to take. In operating the switch D, the bar 44 is returned to upright neutral position (solid lines, Fig. 4) after the designated turn has been made.

The device is not confined entirely to use as a direction indicator, since the swinging of the switch bar 44 can be stopped short of either of the contact plates 47. Said bar 44 contacting only with one of the plates 46, causes the warning lamp 37 alone to be lighted, the lighting of which lamp alone would be construed universally as a warning against stopping or slowing down. The conventional stop lights, operated by automobile braking mechanism may be used in conjunction with our device in which event it s unnecessary to warn against stopping or slowing down through the lighting of our warning lamp 37 by the operation manually of the switch bar 44 or automatically by automobile braking mechanism, as is contemplated.

Among the prime advantages resident in our improvement, are the comparatively low cost of construction, low cost of operation, and the effectiveness of the device so constructed and operated. In this connection attention is invited to the lamps 30 and 31, each of which illuminates three direction indicating symbols by reason of the peculiar structure provided. In this structure, and without impairing the effect of either of lamps 30 and 31 in illuminating their respective symbols, the longitudinal partition 18 prevents the illumination of the front symbols by light rays from behind and likewise functions in respect to the back symbols in the presence of light rays from the front. Said partition 18, therefore, precludes any chance of visibility of the front and back symbols, except through the lighting of the lamps 30 and 31.

In the structure shown in Figs. 6 to 8 inclusive, two housings A' and A² are shown, one for application to the front of an automobile and one for application to the back thereof. Said housings are identical, each being similar to the housing A previously described, except that no longitudinal partition is provided and with the further exception that each of the sidewalls a' of the housing A' and a of the housing A² consists simply of a panel of sheet metal. In the wiring employed, the two warning lamps 37 are in the same circuit (Fig. 8). The two lamps 30, like the two lamps 31, are included in a circuit common to both.

Changes in the specific form of our invention, as herein disclosed, may be made within the scope of what is claimed without departing from the spirit of our invention.

Having described our invention, what we claim as new and desire to protect by Letters Patent is:

In a device of the class described, a housing formed with a bottom, a partition extending across said bottom, an electric light bulb, said partition being formed with an opening corresponding to the contour of said light bulb and being smaller near its lower end, an opening in said bottom in proximity to said partition opening, said bulb being insertable through said bottom opening and into said partition opening, said bottom opening being of sufficient dimensions to permit of the lateral movement of said bulb into and out of said partition opening, a plate for closing said bottom opening, said bulb being mounted on said plate and means for attaching said plate to said housing.

In testimony whereof we have signed our names to this specification.

NELS H. NELSON.
HENRY M. NELSON.